June 21, 1955 J. SELZER 2,711,342
UPRIGHT EXTENSIONS FOR VEHICLE BODIES
Filed Nov. 2, 1951 4 Sheets-Sheet 2

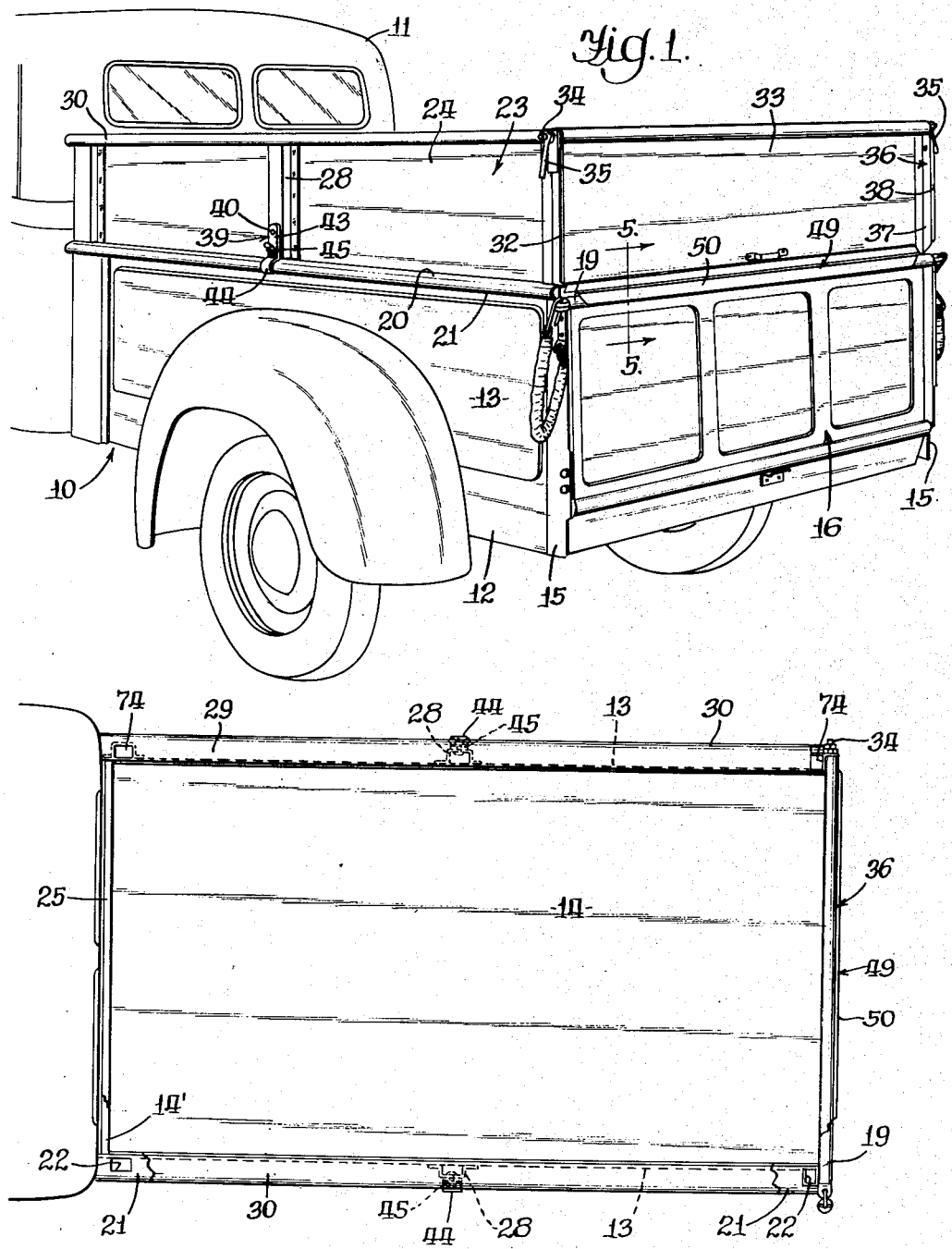

INVENTOR.
John Selzer
BY Paul O. Pippel
Atty.

June 21, 1955         J. SELZER              2,711,342
          UPRIGHT EXTENSIONS FOR VEHICLE BODIES
Filed Nov. 2, 1951                        4 Sheets-Sheet 3

INVENTOR.
John Selzer
BY Paul O. Pippel
         Atty

June 21, 1955  J. SELZER  2,711,342
UPRIGHT EXTENSIONS FOR VEHICLE BODIES
Filed Nov. 2, 1951  4 Sheets-Sheet 4

INVENTOR.
John Selzer
BY Paul O. Pippel
Atty.

United States Patent Office 2,711,342
Patented June 21, 1955

2,711,342

UPRIGHT EXTENSIONS FOR VEHICLE BODIES

John Selzer, Fort Wayne, Ind., assignor to International Harvester Company, a corporation of New Jersey Application November 2, 1951, Serial No. 254,529

6 Claims. (Cl. 296—32)

This invention relates to vehicle bodies, and more particularly to attachments for conventional pick-up type motor truck bodies for adapting the bodies for many new uses and to generally increase the load carrying capacity of the truck.

Conventional pick-up type truck bodies usually consist of a pair of spaced side panels rigidly attached to a supporting floor. A front panel interconnects the forward ends of the side panels and an end gate is provided at the opposite ends thereof. The panels and end gate extend vertically from the floor a comparatively short distance and for this reason the kind of cargo and the volume thereof is greatly limited. It is, therefore, the primary object of the present invention to provide an attachment for a conventional pick-up type body to increase the usability and the volumetric capacity of the motor truck to which it is applied.

Another object is to provide a grain-tight attachment for a pick-up type truck body to at least double the grain or other granular material carrying-capacity of the body.

A further object is the provision of a stock-rack attachment which is readily assembled directly on the body or on an intermediate section which, in turn, is attached to the body.

Still another object is the provision of a body extension having a novel closure member at one end which mates with the truck body end gate to form a grain-tight box.

The foregoing and other important objects and desirable features inherent in and encompassed by this invention, together with many of the purposes and uses thereof, will become readily apparent from a reading of the ensuing description in conjunction with the annexed drawings, in which:

Figure 1 is a perspective view of a pick-up type motor truck taken from a point disposed angularly to the rear of the truck showing a grain-tight attachment assembled on the truck;

Figure 2 is a plan view of the structure illustrated in Figure 1;

Figure 5:
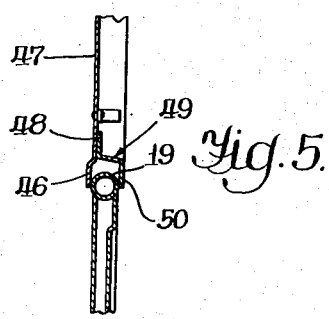
Figure 5 is a fragmentary sectional view taken substantially along line 5—5 of Figure 1.

Referring to the drawings in detail wherein like reference characters designate like elements throughout the various views, there is shown the rear portion of a conventional pick-up type motor truck 10. The motor truck 10 includes a forwardly disposed operator's compartment 11 (partially shown) and a pick-up type vehicle body 12. The body 12 is generally illustrated as having a pair of spaced opposite side panels 13 and a floor 14. The rear edge of each side panel 13 is formed with a vertically extending portion 15 formed as an integral part of the panel and providing an off-set portion adapted to receive an end-gate 16 which is pivoted at its lower end on a transverse horizontal axis to the side panels 13, the axis lying generally in the horizontal plane of the floor 14. The outwardly facing ends 17 of the end-gate 16 lie, respectively, in substantially the same vertical planes as the portions 15 and are adapted to abut the portions 15, as shown in Figure 1, when the end-gate 16 is in its closed position. Each end of the end-gate 16 is formed with oppositely extending flange 18 which overlaps the respective portions 15 when the end-gate 16 is in the position shown in Figures 1, 2, 6 and 8 to provide a grain-tight seal between the end-gate and the side panels 13. The upper end of the end-gate 16 is defined by a bead 19, integrally formed thereon, having a circular cross-section, as best illustrated in Figure 5.

The forward ends of the side panels 13 are inter-connected by means of a front panel 14' having the same vertical dimension as the side panels 13. As best shown in Figures 2, 4, 7 and 9, the top surfaces 20 of the side and front panels 13, 14' are formed by extending the panels horizontally outwardly. A bead 21, having a U-shaped cross-section, is integrally formed with the top surface 20 of each side panel 13 and projects outwardly from its respective side panel. The top surface 20 of each of the side panels 13 has a pair of longitudinally spaced upwardly facing openings 22, as shown in Figure 2, formed therein which serve as stake-receiving sockets. It will be understood that the openings 22 are disposed at each of the four corners of the body 12.

Figure 3:
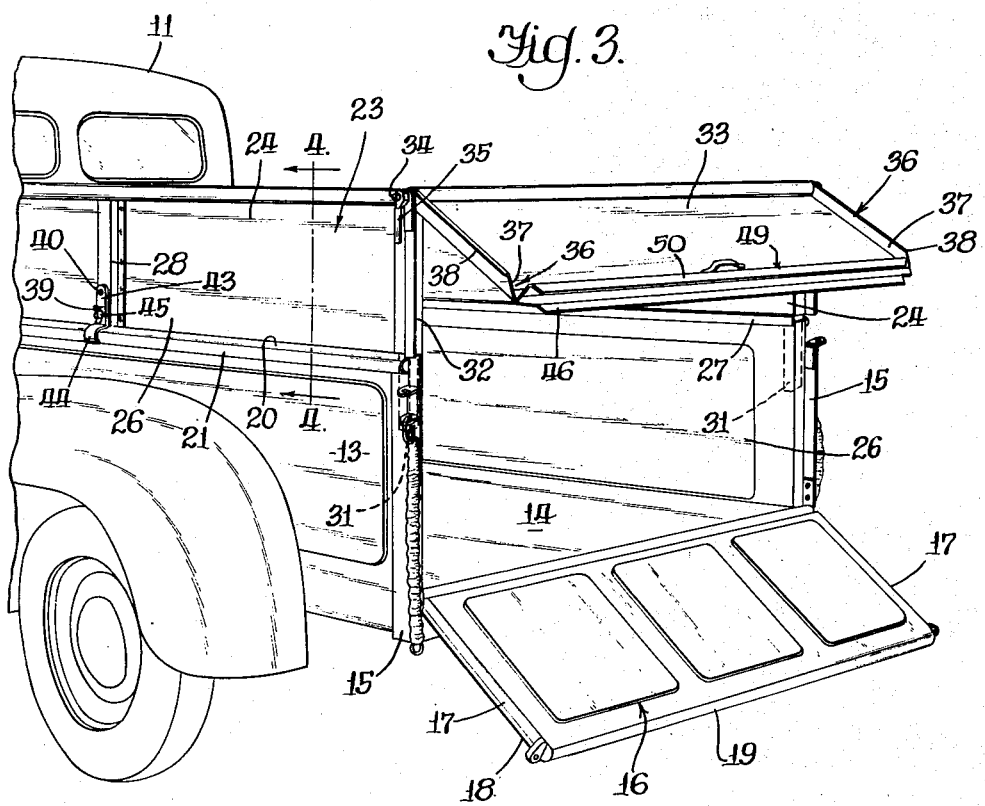
Figure 3 is a view similar to Figure 1 showing the end gate of the truck body and the closure member of the attachment disengaged.
Figure 4:
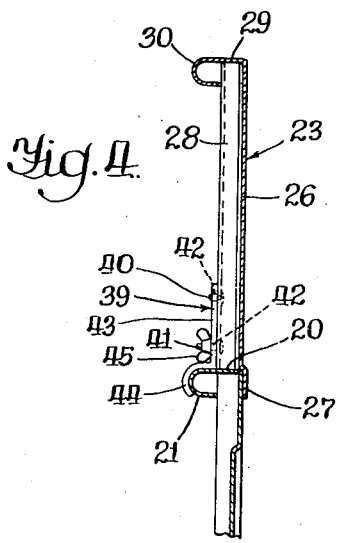
Figure 4 is a detailed sectional view taken substantially along line 4—4 of Figure 3.

The above described vehicle structure is considered conventional and forms no part of the present invention. While a conventional pick-up type truck is extremely useful for many hauling operations it has several drawbacks which limit its use in certain operations. It is also obvious that the volume of load which a conventional pick-up truck can carry is definitely limited because of the relatively short distance the panels and end-gate extend vertically above the floor. As an example, the motor truck may be capable of carrying a load weighing twice as much as it actually does since the volumetric capacity rather than the weight capacity of the truck may be the determining factor in certain hauling operations. This is especially true when the truck is used for hauling granular material such as grain or the like. In order to increase the volumetric capacity of the motor truck body 12 a grain-tight attachment, designated generally by numeral 23 and shown in Figures 1 and 3, is fastened to the body. The attachment 23 includes a pair of spaced side sections 24 which have their rearwardmost marginal edges rigidly secured to respective opposite ends of a front section 25. Each section 24, 25 comprises a single, vertically disposed sheet of metal 26 having slightly offset, integrally formed flanges 27 depending therefrom, the purpose of which will be explained hereinafter. Positioned at each end of the side and front sections 24, 25 and intermediate the ends are vertically disposed rib members 28 having a channel section. The rib members 28 are rigidly fastened to respective metal sheets 26 by any suitable means, such as by welding or the like, and strengthen the sections. The metal sheets 26 are formed to provide flat, horizontal upper surfaces 29 which extend outwardly. Beads 30, similar to beads 19, are integrally formed with the upper surfaces 29. Rigidly fastened to the rib members 28 disposed at each end of the side sections 24 are stakes 31 which extend below the lower marginal edges of the sections 24.

The rear edge of each side section 24 is formed with a vertically extending flange 32 formed as an integral part of the metal sheet 26 to provide an off-set portion. A closure member 33 is pivoted at its upper end by means of a rod 34 on a transverse horizontal axis to the flanges 32. Clamping levers 35 engage threaded portions on each end of the rod 34 to secure the closure member 33 to the side sections 24. The transversely disposed ends of the closure member 33 are defined by integrally formed L-shaped flanges 36, one leg 37 of each being adapted to abut a respective flange 32 when the closure member 33 is in the position shown in Figure 1 and the other leg 38 engaging the rearward edge of the same flange 32.

In order to increase the volumetric capacity of the motor truck 10 the attachment 23 is placed on the body 12 by first inserting the depending stakes 31 into the stake-receiving pockets 22 formed in the side panels 13. The attachment 23 is then lowered vertically until the side and front sections 24, 25, which are rigidly interconnected, rest upon the top surfaces 20 of the side and front panels 13, 14' respectively. In this position the slightly off-set flanges 27 depending from the sections 24 and 25 abut the inwardly facing surfaces of the side and front panels 13, 14'. Securing means are provided for maintaining the attachment 23 in its assembled condition which include a pair of clamping elements 39, one of the elements 39 being carried by each of the intermediate rib members 28 of the side sections 24. Each intermediate rib member 28 is provided with an outwardly projecting pin 40 and a threaded member 41 which are insertable in a pair of apertures 42 formed in a vertical portion 43 of each clamping element 39. Depending from the vertical portion 43 of each clamping element 39 is a C-shaped portion 44 which is adapted to engage the bead 21 of the side panel 13 adjacent thereto. A wing nut 45 is then screwed on the threaded member 41 to tightly grip the upper edge of the side panels 13 between the clamping elements 39 and the flanges 27 depending from the side sections 24. It will be obvious from the foregoing that the juncture between the truck body 12 and the side and front sections 24, 25 is completely grain-tight by virtue of the flanges 27 and the attachment 23 is rigidly maintained on and prevented from moving relatively to the body 12 by the stakes 31, the flanges 27 and the clamping elements 39.

The lower edge of the closure member 33 is defined by a slightly off-set continuation 46 of the sheet metal section 47. One leg 48 of a metal strip 49 having a Z-shaped cross-section is welded to the sheet metal section 47 whereby the opposite leg 50 is longitudinally spaced from the continuation 46. In order to close the rear end of the truck body 12 and the attachment 23, the end-gate 16 is swung upwardly and the closure member 33 is swung downwardly until the bead 19 is adjacent the lower edge of the closure member 33. The bead 19 is caused to enter the space between the continuation 46 and the leg 50 as best shown in Figure 5. The end gate 16 is then locked in its closed position by any suitable means and the clamping levers 35 are tightened to lock the closure member 33 in its closed position. By virtue of the simple and unique structure described above, a grain-tight seal is obtained between the closure member 33 and the end-gate 16.

Figure 8:
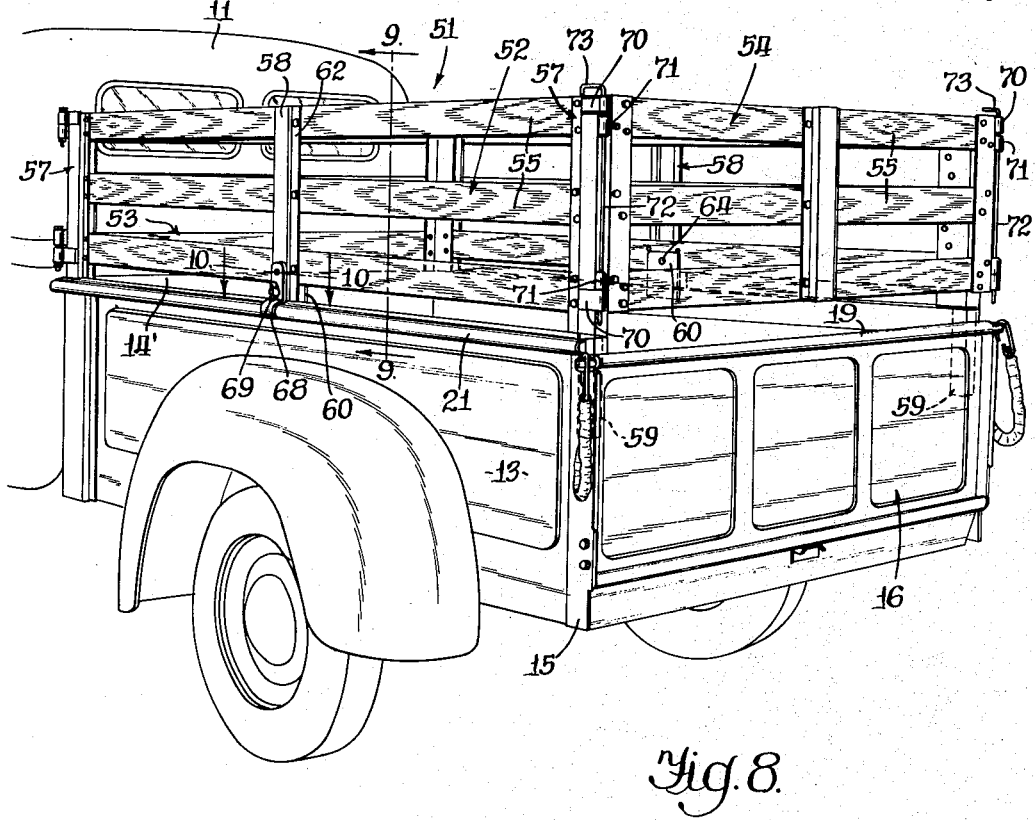
Figure 8 is a view similar to Figure 1 showing a stock-rack attachment fastened to the truck body.
Figure 9:
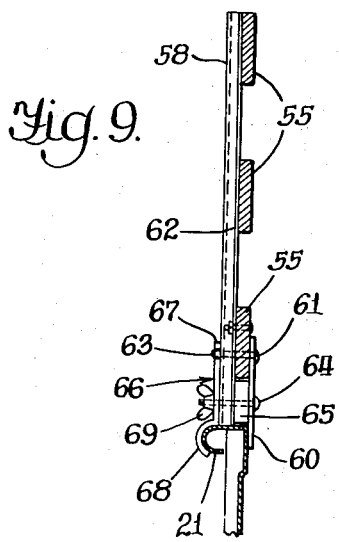
Figure 9 is a sectional view taken substantially along line 9—9 of Figure 8.
Figure 10:
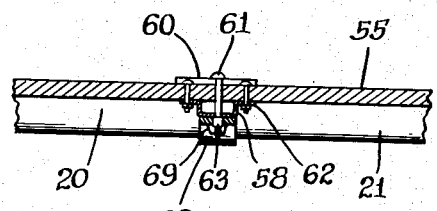
Figure 10 is an enlarged, sectional view taken substantially along line 10—10 of Figure 8.

In the event it is desired to haul livestock or other bulky material requiring side boards that extend a greater vertical distance off the floor 14 than the conventional pick-up type body 12, the stock-rack attachment 51, shown in Figures 8, 9 and 10, can be quickly and easily mounted on the body 12. The stock-rack attachment 51 comprises a pair of side sections 52 pivotally connected to a front section 53 at one end and to a rear section 54 at their opposite ends. Each section 52, 53, 54 includes three vertically spaced boards 55 which have their ends confined between the flanges 56 of U-shaped pillar posts 57. Midway between the pillar posts 57 of each section a channel member 58 is bolted to the boards 55 to add rigidity and strength to the section. Depending from each of the pillar posts 57 of the side sections 52 is a stake 59 which is receivable in the stake-receiving sockets 22 formed in the side panels 13.

Referring to Figure 9, it will be noted that a clamping plate 60 is positioned adjacent each of the intermediate channel members 58 of the side sections 52. The clamping plates 60 carry pins 61 which extend through aligned apertures in the lowermost boards 55 of the side sections 52 and the webs 62 of the intermediate channel members 58. A part 63 of each pin 61 extends outwardly from the web 62 of each channel member 58. Each plate 60 also carries a bolt 64 which extends through a spacer block 65 and the channel member 58 associated therewith. A clamping element 66 having a vertical portion 67 provided with a pair of vertically aligned apertures for loosely receiving the part 63 of pin 61 and the bolt 64 abuts the web 62 of each intermediate channel member 58. Integrally formed with the vertical portion 67 of each clamping element 66 and depending therefrom is a C-shaped portion 68 which is adapted to engage the bead 21 of the side panel 13 adjacent thereto. A wing nut 69 cooperable with the bolt 64 is turned to tightly grip the upper edge of the side panels 13 between clamping elements 66 and the plates 60 which extend below the lowermost boards 55 of the side sections 52. The pin 61, like its counterpart pin 40 in the attachment shown in Figure 1, correctly positions the clamping element on the channel member 58 and prevents the same from canting during the clamping operation.

The rear section 54, as shown in Figure 8, is removably connected to the side sections 52. The pillar posts 57 of the rear section 54 are each provided with a pair of spaced hinge elements 70 which are alignable with similar hinge elements 71 carried by the rear pillar posts 57 of each side section 52. Rods 72 having off-set head portions 73 are adapted to extend through the hinge elements 70 and 71 to connect the rear and side sections 52, 54 together.

Figure 6:
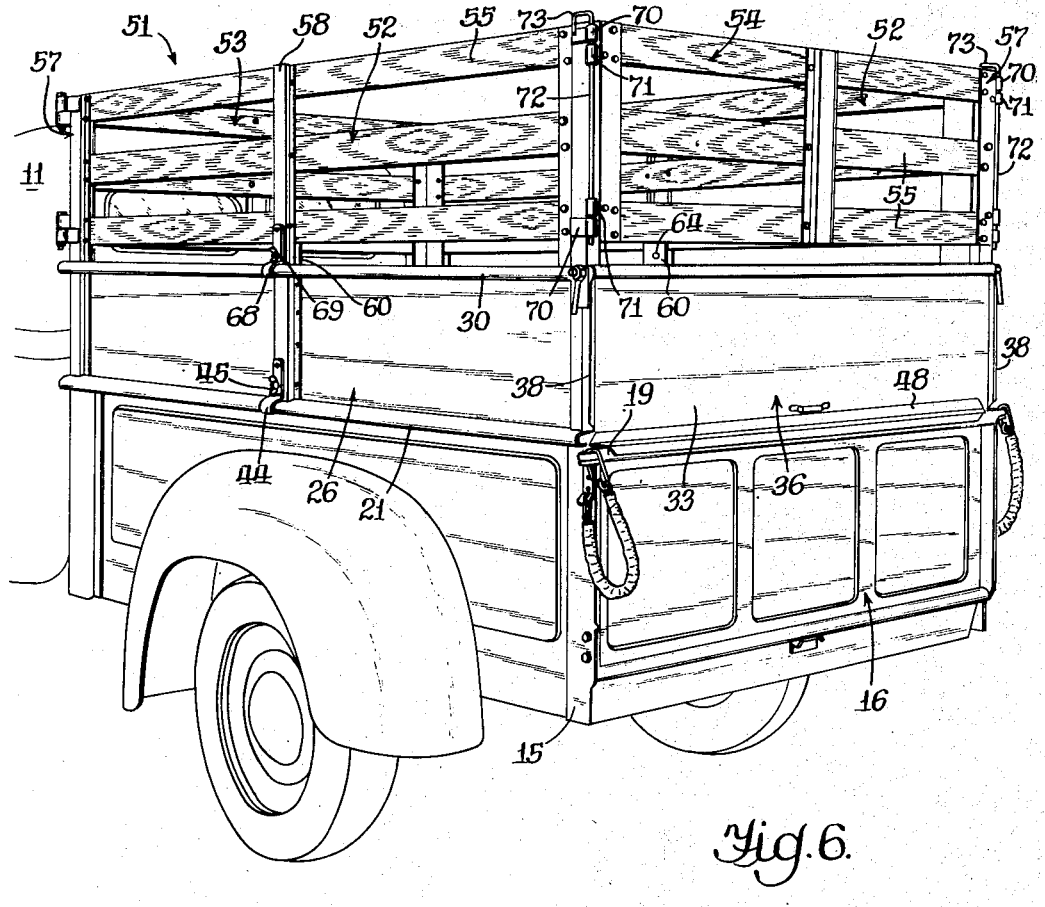
Figure 6 is a view similar to Figure 1 showing a stock-rack attachment mounted on a grain-tight box which, in turn, is fastened to the truck body.
Figure 7:
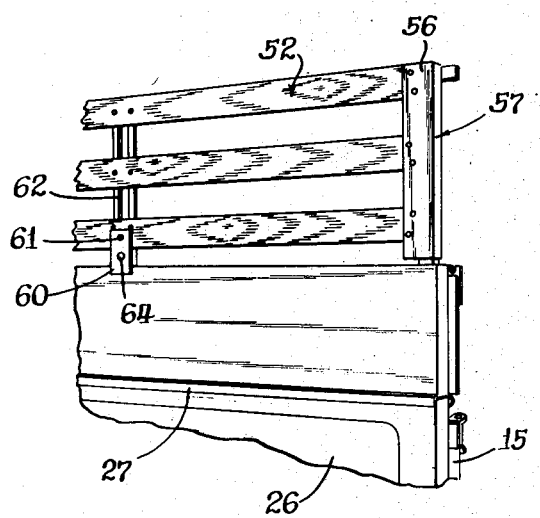
Figure 7 is an enlarged detail view of the rear portion of the right side panel of the structure illustrated in Figure 6.

Oftentimes, because of the kind and size of the cargo to be hauled it is desirable to extend the vertical height of the truck body above that which is obtainable with the utilization of one of the above described attachments. In order to provide for this contingency longitudinally spaced openings 74 are formed in the flat, upper surfaces 29 of the side sections 24 of the grain-tight attachment 23, for receiving the stakes 59 depending from the pillar posts 57 of tthe side sections 52 of the stock-rack attachment 51. The grain-tight attachment 23 is assembled on the truck body 12 in the manner described above. Thereafter, the stakes 59 are inserted in the openings 74, and extend into the pocket defined by the rib members 28 adjacent each end of the side sections 24 and the metal sheets 26. The stock-rack attachment is then lowered until the lower end of the pillar posts 57 abut the upper surfaces 29 of the attachment 23. In this position, the clamping plates 60 overlap the side sections 24, as shown in Figures 6 and 7, and the C-shaped portions 68 engage the beads 30 of the grain-tight attachment 23.

The embodiments of the invention chosen for the purposes of illustration and description herein are those preferred based upon the requirements for achieving the objects of the invention and developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. An attachment for a pick-up type truck body having a U-shaped, upright structure provided with a flat top surface, comprising: a first upright, U-shaped extension, the bottom surface of said extension being flat and adapted to abut the flat top surface of said structure; means extending below the flat bottom surface of said extension on one side thereof for overlapping said structure; clamping means carried by said extension for removably securing said extension to said structure; a second upright extension positioned above said first extension; flange means depending from the bottom surface of said second extension adapted to overlap one side of said first extension; and means carried by said second extension for removably securing said extension to said first extension, said means including C-shaped portions engageable with the top edge of said first extension and being disposed on the side of said first extension opposite said flange means, and manually adjustable means for moving said C-shaped portions toward said flange means to firmly grip the edge of said first extension.

2. An attachment for a pick-up type truck body having a pair of spaced, upright side panels interconnected at one end by a front panel and at its opposite end by an end gate, each of said side panels being provided with a pair of longitudinally spaced, vertically disposed stake-receiving sockets, and an outwardly projecting bead extending from the top surface thereof comprising: a pair of upright side sections, each of said sections having a pair of stakes depending therefrom receivable in said sockets; a front section having its ends rigidly connected to respective ends of said side sections, the bottom surfaces of said side and front sections being adapted to abut respective top surfaces of said side and front panels and being disposed in vertical planes spaced inwardly from said beads; a flange depending below the bottom surfaces of said side and front sections, said flange being adapted to overlap one side of said side and front panels; a closure member having its upper end pivotally attached to and supported by said side sections, said member being swingable about a transverse horizontal axis, the lower marginal edge of said member being provided with a pair of spaced depending projections for embracing the upper marginal edge of said end gate; and clamping means carried by said side sections for removably securing said closure member, side, and front sections to said body, said means including elements having C-shaped portions horizontally aligned with certain portions of said flange and engageable with said beads, and manually adjustable means for bodily moving said elements inwardly horizontally with respect to said side sections and side panels toward said certain portions of said flange to grip the top edges of said side panels between said C-shaped portions and said certain portions of said flange to prevent vertical and horizontal displacement of said side sections from said side panels.

3. An attachment for a pick-up type truck body having a U-shaped, upright structure, the leg portions of said U-shaped structure having a plurality of upwardly facing openings therein, and an end gate interconnecting said leg portions comprising: an upright U-shaped extension, the bottom surface of said extension being adapted to abut the top surface of said structure and the leg portions of said extension being provided with depending elements receivable in said openings; a flange depending from the bottom surface of said extension adapted to overlap said structure on one side thereof; a closure member having its upper end pivotally attached to said leg portions of said extension, said member being swingable about a transverse horizontal axis, the lower marginal edge of said member being provided with a pair of spaced depending projections for embracing the upper marginal edge of said end gate; and clamping means carried by said leg portions of said extension for removably securing said extension and closure member to said body, said means including elements having C-shaped portions disposed on the side of each of said leg portions of said extension opposite the flange thereof, and manually adjustable means for moving said C-shaped portions toward said flange to grip the top edges of said structure between said C-shaped portions and said flange.

4. An attachment for a pick-up type truck body having a pair of spaced, upright side panels interconnected at one end thereof by a front panel, each of said side panels being provided with a pair of longitudinally spaced, vertically disposed stake-receiving sockets and an outwardly projecting semi-cylindrical bead extending from the top surface thereof, comprising: a pair of upright side sections, each of said sections having a pair of stakes depending therefrom receivable in said sockets; a front section having its ends rigidly connected to respective ends of said side sections to provide a substantially U-shaped structure, the bottom surfaces of said rigidly interconnected side and front sections forming said U-shaped structure being adapted to abut respective top surface of said side and front panels and being disposed in vertical planes spaced inwardly from said beads; a flange depending from the bottom surface of said U-shaped structure, said flange being adapted to overlap one side of said side and front panels; and clamping means carried by said side sections for removably securing said U-shaped structure to said body, said clamping means including elements having arcuately shaped portions horizontally alignable with certain portions of said flange, said portions, said bottom surface of said side sections, and said certain portions of said flange defining pockets for receiving the top edges of said side panels, and manually adjustable means for moving said arcuately shaped portions toward said certain portions of said flange to prevent displacement of the top edges of said side panels from said pockets.

5. An attachment for a pick-up type truck body having a U-shaped, upright structure, the leg portions of said U-shaped structure having a plurality of vertically disposed stake-receiving sockets provided therein and outwardly projecting semi-cylindrical beads extending from the top surface thereof, comprising: an upright U-shaped extension, the bottom surface of said U-shaped extension being adapted to abut the top surface of said U-shaped structure and the leg portions of said extension having stakes depending therefrom receivable in said sockets; a flange depending from the bottom surface of said extension adapted to overlap said structure on one side thereof; and clamping means carried by said leg portions of said extension for removably securing said extension to said structure including depending arcuately shaped portions adapted to extend around said beads, and manually adjustable means for moving said portions horizontally with respect to said flange and structure to force and maintain the top edge of said structure against said flange.

6. An attachment for a pick-up type truck body having a pair of spaced, upright side panels interconnected at one end thereof by a front panel, each of said side panels being provided with a pair of longitudinally spaced, vertically disposed stake-receiving sockets and an outwardly projecting semi-cylindrical bead extending from the top surface thereof, comprising: a stock-rack including a pair of side sections, each of said sections having a pair of stakes depending therefrom receivable in said sockets, a front section having its ends removably connected to the opposite ends of said side sections; and clamping means for removably securing said stock-rack to said body including plates depending below the lower marginal edge of said side sections adapted to overlap said side panels and an element associated with each plate for engaging the bead of the side panel adjacent thereto, each of said elements including a vertically extending elongated portion and an arcuately shaped portion depending below the marginal edge of said side sections and abutting the bead adjacent thereto, and manually adjustable means carried by said side sections for bodily moving each of said elements with respect to the side panels and sections toward a respective plate to firmly grip the top edges of said side panels.

References Cited in the file of this patent

UNITED STATES PATENTS

| | | | |
|---|---|---|---|
| 497,577 | Johnson | | May 16, 1893 |
| 791,532 | Anderson | | June 6, 1905 |
| 941,956 | Sanders et al. | | Nov. 30, 1909 |
| 1,227,757 | Dahlen | | May 29, 1917 |
| 1,306,626 | Redmond | | June 10, 1919 |
| 1,425,596 | Kramer | | Aug. 15, 1922 |
| 1,461,906 | Hughes | | July 17, 1923 |
| 2,324,508 | Johnson | | July 20, 1943 |